(12) United States Patent
Coulmeau et al.

(10) Patent No.: US 8,386,174 B2
(45) Date of Patent: Feb. 26, 2013

(54) METHOD AND DEVICE FOR CALCULATING A TIME WINDOW

(75) Inventors: François Coulmeau, Seilh (FR); Antoine Lacombe, Monferran-Saves (FR); Xavier Blanchon, Toulouse (FR); Fany Barailler, Toulouse (FR)

(73) Assignee: Thales, Neuilly sur Seine (FR)

( * ) Notice: Subject to any disclaimer, the term of this patent is extended or adjusted under 35 U.S.C. 154(b) by 247 days.

(21) Appl. No.: 12/973,438

(22) Filed: Dec. 20, 2010

(65) Prior Publication Data

US 2011/0153204 A1 Jun. 23, 2011

(30) Foreign Application Priority Data

Dec. 23, 2009 (FR) .................................... 09 06288

(51) Int. Cl.
*G01C 21/00* (2006.01)
(52) U.S. Cl. ............ 701/465; 701/466; 701/528; 703/2; 340/994
(58) Field of Classification Search .......... 701/465–467, 701/527–529; 703/2; 340/994
See application file for complete search history.

(56) References Cited

U.S. PATENT DOCUMENTS

| 4,774,670 | A | 9/1988 | Palmieri |
| 5,051,910 | A | 9/1991 | Liden |
| 6,581,008 | B2 * | 6/2003 | Intriligator et al. ................ 702/3 |
| 6,816,786 | B2 * | 11/2004 | Intriligator et al. ................ 702/3 |
| 7,096,121 | B2 * | 8/2006 | Intriligator et al. ................ 702/3 |
| 7,103,480 | B2 * | 9/2006 | Intriligator et al. ................ 702/3 |
| 7,876,927 | B2 * | 1/2011 | Han et al. ....................... 382/104 |
| 8,135,413 | B2 * | 3/2012 | Dupray ....................... 455/456.1 |
| 8,150,574 | B2 * | 4/2012 | Han et al. ......................... 701/28 |
| 2007/0078573 | A1 * | 4/2007 | Ivansson et al. ................ 701/14 |
| 2007/0100538 | A1 | 5/2007 | Wise et al. |
| 2008/0228333 | A1 | 9/2008 | De Menorval et al. |

OTHER PUBLICATIONS

Liden, S. Practical Considerations in Optimal Flight Management Computations, American Control Conference, 1985, pp. 675-681.*
Liden, S. Optimum 4D Guidance for Long Flights, IEEE/AIAA 11th Digital Avionics Systems Conference, 1992, pp. 262-267.*

* cited by examiner

*Primary Examiner* — Russell Frejd
(74) *Attorney, Agent, or Firm* — Baker Hostetler LLP

(57) ABSTRACT

The invention relates to a method and a device for calculating a time window for a time constraint of arrival of an aircraft at a given point, the aircraft receiving wind predictions and including a sensor for measuring the wind. The method includes a calculation of a first time window, and the calculation of an overall confidence index having the determination of a first confidence index on the basis of a deviation between wind predictions and wind measurements performed by the aircraft, the calculation of a margin for the time constraint on the basis of the overall confidence index, and the calculation of a second window on the basis of the first time window and of the calculated margin.

10 Claims, 2 Drawing Sheets

METHOD AND DEVICE FOR CALCULATING A TIME WINDOW

CROSS-REFERENCE TO RELATED APPLICATION

This application claims priority to foreign French patent application No. FR 09 06288, filed on Dec. 23, 2009, the disclosure of which is incorporated by reference in its entirety.

FIELD OF THE INVENTION

The invention relates to the field of air traffic management and, more particularly, the determination of time windows for time contracts.

BACKGROUND OF THE INVENTION

A flight management system FMS aboard an aircraft fulfils notably the function of predicting the progress of a flight plan. This involves predictions at each point of time of passby, speed and fuel consumed.

These predictions are extremely dependent notably on the meteorological conditions and, more particularly, on the winds encountered. The predictions of the FMS are based at one and the same time on a model entered by the company (arising from meteorological modelling) and on a measurement made by sensors aboard the aircraft.

Within the framework of the future concepts of air traffic management, and solutions envisaged for increasing airspace capacity while guaranteeing the safety level demanded, it is envisaged that aircraft will increasingly communicate these predictions to the ATC (Air traffic control).

By virtue of the information regarding passby time, the ATC ascertains the margins of manoeuvre of each aircraft and can give them directives (ATC clearances) to keep the traffic flowing and increase the overall capacity of the air transport system.

The ATC is envisaging notably drawing up ever more RTA (for Required Time of Arrival) contracts with aircraft to ensure the sequencing of traffic arrivals of large airport hubs. An RTA contract imposes an airport arrival time on an aircraft. The aim is to guarantee an approach flow which is close to the maximum capacity of the landing runway, and acceptable from an air traffic control point of view, while reducing to the maximum the holding circuits on arrival.

In order that the tools for scheduling and regulating traffic on the ground can provide aircraft with precise time constraints, it is necessary that aircraft be able to provide the ATC with reliable predictions about the passby times at the points of the flight plan and that they be in a position to adhere to them precisely. Indeed, the ground tools are based on the estimations of passby times at characteristic points in order to perform their flow optimization. Non-compliance with the passby times destabilizes the system.

As regards the RTA clearance, the aeroplane provides the ATC with the minimum time ETAmin (for Estimated Time of Arrival Minimum) and maximum time ETAmax (for Estimated Time of Arrival Maximum) at which the aeroplane can overfly a precise point as a function of its capabilities, of its configuration and of the meteorological conditions.

In order that the ATC has a margin of manoeuvre in the sequencing of aircraft and that this margin of manoeuvre is truly effective, it is important that each aeroplane provides the largest possible time window ETAmin-ETAmax, while guaranteeing its capability to be able to comply with its predictions in this time window (i.e. this window must be reliable).

FIG. 1 illustrates an ETAmin-ETAmax time window and the uncertainty margins taken by the FMS. The FMS calculates reliable margins in the predictions ETAmin and ETAmax communicated to the ATC as a function of the meteorological unknowns which may arise. In practice, the FMS calculates a first time window, termed a raw RTA window, on the basis of raw forecasts of raw minimum arrival time ETAminRaw and of raw maximum arrival time ETAmaxRaw. The FMS thereafter calculates a second time window intended to be communicated to the ATC. The second window corresponds to the first window from which two margins are removed. A first margin MarginMin takes into account a headwind of 10 knots and a second margin MarginMax takes into account a tailwind of 10 knots. The value of 10 knots is related to the precision of the meteorological forecasts announced by the provider of these forecasts which are precise to within 10 knots, 95% of the time. It is useful to take penalizing margins on these data to calculate the minimum and maximum arrival times and communicate them to the ATC.

But these margins are not entirely satisfactory since they are static and do not make it possible to take precise account of the vagaries encountered by an aircraft.

Current systems take a constant, conservative margin, presumed to be valid in most cases. This margin is consequently fairly high, and therefore decreases the time window unnecessarily.

SUMMARY OF THE INVENTION

The invention alleviates the above and other problems with a method and a device for calculating a time window of a more precise time constraint.

The invention includes a method for calculating a time window for an RTA time constraint of arrival of an aircraft at a given point, the aircraft receiving wind predictions and including a sensor for measuring the wind, the said method comprising a calculation of a first time window, the method also including the following steps:
  the calculation of an overall confidence index $T_G$ comprising the determination of a first confidence index $T_1$ on the basis of a deviation between wind predictions and wind measurements performed by the aircraft,
  the calculation of a margin for the time constraint on the basis of the overall confidence index $T_G$,
  the calculation of a second time window on the basis of the first time window and of the calculated margin.

According to the invention, the determination of a first confidence index ($T_1$) comprises the calculation of a bias defining a mean deviation between the wind predictions and measurements performed during a time interval (D).

Advantageously, the calculation of the overall confidence index ($T_G$) comprises the determination of a second confidence index ($T_2$), taking into account the stability of the winds, on the basis of the calculation of a standard deviation in the winds measured by the aircraft.

Advantageously, the wind predictions being delivered by a source, the calculation of an overall confidence index ($T_G$) comprises the determination of a third confidence index ($T_3$) on the basis of a confidence level accorded to the source delivering the wind predictions.

Advantageously, the wind predictions being updated at regular intervals, the calculation of an overall confidence index ($T_G$) comprises the determination of a fourth confidence index ($T_4$) taking into account the last date of updating of the wind predictions.

Advantageously, the calculation of an overall confidence index ($T_G$) comprises the determination of a fifth confidence index ($T_5$) on the basis of the distance between the aircraft and the point at which the time constraint (RTA) is fixed.

Advantageously, the RTA time constraint being established by a communication between the aircraft and an air traffic controller, the calculation of an overall confidence index ($T_G$) comprises the determination of a sixth confidence index ($T_6$) on the basis of the duration of the communications between the air traffic controller and the aircraft.

Advantageously, the calculation of an overall confidence index ($T_G$) is carried out by an arbitrary combination of the first ($T_1$), of the second ($T_2$), of the third ($T_3$), of the fourth ($T_4$), of the fifth ($T_5$), and of the sixth ($T_6$) confidence index, the said combination being a weighted sum.

Advantageously, the aircraft following a trajectory to attain the given point, the trajectory comprising speed limitations, the method furthermore comprises the following steps: the addition of a margin in the speed limitations of the trajectory and the calculation of a minimum time of arrival ETAmin at the given point on the basis of a maximum speed complying with the margins in the speed limitations, the calculation of the second time window taking into account the minimum time of arrival ETAmin at the given point.

The invention also provides a device for calculating a time window for a time constraint (RTA) of arrival of an aircraft at a given point, the aircraft receiving wind predictions and including a sensor for measuring the wind, the device including means for calculating a first time window, the device further including:

means for calculating an overall confidence index ($T_G$) comprising the determination of a first confidence index ($T_1$) on the basis of a deviation between wind predictions and wind measurements performed by the aircraft, means for calculating a margin for the time constraint on the basis of the overall confidence index ($T_G$), means for calculating a second window on the basis of the first time window and of the calculated margin.

The invention increases the reliability of the predictions of a flight management system FMS communicated to the air traffic control by virtue of optimal management of the calculation margins thus implying more precise management of ever denser traffic.

BRIEF DESCRIPTION OF THE DRAWINGS

The invention will be better understood and other advantages will become apparent on reading the detailed description given by way of nonlimiting example and with the aid of the figures among which.

DETAILED DESCRIPTION

Figure 1:
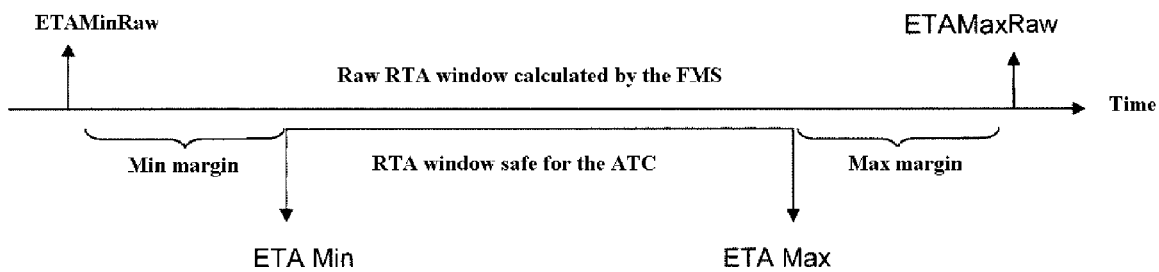
FIG. 1, already presented, illustrates a time window and uncertainty margins calculated by a flight management system.

To establish flight predictions, the FMS bases itself, on the one hand, on meteorological data input by the pilot (on the basis of a meteorological map) or communicated to the FMS by virtue of a digital data link by the airline and, on the other hand, by meteorological context data measured in the environment close to the aeroplane.

The method according to the invention calculates a time window for an RTA time constraint of arrival of an aircraft at a given point. This method includes the following steps:

the calculation of an overall confidence index $T_G$ comprising the determination of a first confidence index $T_1$ on the basis of a deviation between wind predictions and wind measurements performed by the aircraft, the calculation of a margin for the time constraint on the basis of the overall confidence index $T_G$, the calculation of a second time window on the basis of the first time window and of the calculated margin.

The second time window is transmitted to the air traffic control.

The meteorological data entered by the pilot or communicated by the airline exhibit uncertainties that must be integrated into the calculation of the FMS predictions to calculate passby times over waypoints.

In so far as the aircraft has means for measuring during the flight the meteorological data (wind, pressure and temperature) in the environment close to the aeroplane, it is possible to establish and to re-evaluate, permanently, a level of confidence in the meteorological data which are initially advised by the pilot and on which the prediction calculations are based.

The first confidence index $T_1$ reflects this confidence level. It is possible to reduce the meteorological uncertainty margins which are penalizing for the calculation of the minimum ETAmin and maximum ETAmax arrival times if the first confidence index $T_1$ is good.

Stated otherwise, if the data initially entered by the pilot are correct in the close environment, it may be assumed that this is also so in the longer term. In this precise case, we can reduce the margins in the meteorological uncertainties (and more particularly in respect of the wind).

According to the invention, the determination of the first confidence index $T_1$ comprises: a measurement for a predetermined duration D of the real wind with the aid of sensors of the aircraft and a calculation of a bias representing the error of the meteorological predictions with respect to the wind measurement.

Thus, N samples of measured wind are available over the duration D (the samples being performed every x seconds so that D=x*N).

The mean wind measured over a duration D makes it possible through a linear regression to obtain a mean wind dependent on the altitude (for the climb and descent phases) or as a function of the distance traversed for the fixed-altitude cruising phases.

The bias is the mean deviation between the wind model and the measurement, over the interval D, that is to say the error between the modelled wind and the real wind. This bias has a direct impact on the estimated arrival time.

This bias can be used to measure the quality of the interval [ETAMIN, ETAMAX], or to correct the values of ETAMIN, ETAMAX provided.

According to one embodiment, the minimum arrival time ETAmin is calculated by applying a wind V with V=Vmodel+bias where Vmodel is the wind of the model.

According to another embodiment, use is made of a heuristic on the RTA margin dependent on the bias. This heuristic is applied directly after the calculation of the bias.

Generally, if a low bias $B_1$ is measured, then the confidence index $T_1$ will be high.

The following relations are for example used with a confidence index lying between 0 (bad) and 5 (very good):
If abs(B1)<2 knots then T=5 (very good);
If 2 knots<abs(B1)<4 knots then T=4 (good);
If 4 knots<abs(B1)<6 knots then T=3 (average);
If 6 knots<abs(B1)<8 knots then T=2 (average);
If 8 knots<abs(B1)<10 knots then T=1 (bad); and
If 10 knots<abs(B1) then T=0 (very bad),
with abs being the absolute value function.

Advantageously, the calculation of the overall confidence index $T_G$ comprises the determination of a second confidence index $T_2$, taking into account the stability of the winds, on the basis of the calculation of a standard deviation in the winds measured by the aircraft. If the aeroplane is flying in a stable meteorological environment (for example, in an anticyclone), it is possible to increase the confidence in the quality and the reliability of the meteorological data. Consequently, it is possible to allow oneself to reduce the margins taken in the calculation of the time window.

Conversely, in an unstable meteorological environment (a depression or turbulent air, for example), the meteorological conditions are more changeable, and in so far as it is more complex to obtain a precise meteorological model, it is possible to decrease the level of confidence in the meteorological model. Consequently, it is possible to re-evaluate upwards the margins taken in the calculation of the time window.

If the standard deviation is very low then the air is stable, therefore the confidence index is high (for example $T_2=5$) otherwise the confidence index is low (for example $T_2=0$).

As previously noted, it is possible to use relations to link the standard deviation to the second confidence index, or else an affine relation.

Advantageously, the wind predictions being delivered by a source, the calculation of an overall confidence index $T_G$ comprises the determination of a third confidence index $T_3$ on the basis of a confidence level accorded to the source delivering the wind predictions.

The meteorological data entered by the pilot or provided by the company are based on the data provided by providers of meteorological data (METEO FRANCE, for example). A ranking of the meteorological data providers is performed as a function of the quality of their predictions.

There already exist rankings of meteorological data providers based on the quadratic mean of the errors noted between the forecasts of the providers and the data actually measured a posteriori. Confidence index $T_3$ can thus be deduced therefrom as a function of this ranking.

The level of confidence in the meteorological data is higher if the provider is well ranked. It is then possible to reduce the margins that are taken with respect to the meteorological unknowns in the calculation of the time window.

Conversely, the level of confidence in the meteorological data is lower if the provider is poorly ranked. It is therefore possible to increase the margins that are taken with respect to the meteorological unknowns in the calculation of the time window.

It is also possible to determine this confidence index $T_3$ as a function of the following method. The winds are recorded in the course of the flight and they are compared with the winds arising from the provider of weather services. Over a sufficient number of aircraft, it is possible to deduce therefrom a mean error $E_3$ at 1 sigma, by making the approximation that the error in the wind provided is a centred random variable of white noise type.

The following relations are used, for example:
$E_3<2$ knots then $T_3=5$ (very good);
2 knots$\leq E_3<4$ knots then $T_3=4$ (good);
4 knots$\leq E_3<6$ knots then $T_3=3$ (average);
6 knots$\leq E_3<8$ knots then $T_3=2$ (average); and
8 knots$\leq E_3<10$ knots then $T_3=1$ (bad),
where $E_3$ is the mean error in the wind of a provider, established by comparison between measurements of winds and predictions over a given time interval.

Advantageously, the wind predictions being updated at regular intervals, the calculation of an overall confidence index $T_G$ comprises the determination of a fourth confidence index $T_4$ taking into account the last date of updating of the wind predictions. The more recent the data, the higher the confidence index.

To determine the fourth confidence index $T_4$, it is possible to use for example an affine relation or the following relations.

If the predictions are released every X hours, then for a release which dates from the hour H:
If Tcurrent−H<X/10 then $T_4=5$ (very good);
If X/10<Tcurrent−H<X/5 then $T_4=4$ (good);
If X/5<Tcurrent−H<X/3 then $T_4=3$ (average);
If X/3<Tcurrent−H<X/2 then $T_4=2$ (average);
If X/2<Tcurrent−H<2X/3 then $T_4=1$ (bad); and
If 2X/3<Tcurrent−H<X then $T_4=0$ (very bad),
with Tcurrent being the current time.

Advantageously, the calculation of an overall confidence index $T_G$ comprises the determination of a fifth confidence index $T_5$ on the basis of the distance between the aircraft and the point at which the RTA time constraint is fixed.

The fifth confidence index $T_5$ represents the confidence in the meteorological data as a function of the distance between the aeroplane and the point of the RTA time constraint. It is considered that the shorter this distance, the more the meteorological conditions are known in so far as the aeroplane can measure meteorological conditions which apply to the aeroplane and in the near future thereof by virtue of the aeroplane's meteorological radars.

In so far as the level of confidence in the meteorological data is higher in the environment close to the aeroplane, the margins taken with respect to the meteorological unknowns in the calculation of the time window are reduced.

This amounts to using a wind mixing (or blending) algorithm to calculate the minimum ETAmin and maximum ETAmax arrival times.

To determine the fifth confidence index $T_5$, it is possible to use for example an affine relation or the following relations:
If D<50 NM or Tflight<5 minutes, then $T_5=5$ (very good);
If 50<D<100 NM or 5<Tflight<10 minutes, then $T_5=4$ (good);
If 100<D<200 NM or 10<Tflight<20 minutes, then $T_5=3$ (average);
If 200<D<400 NM or 20<Tflight<40 minutes, then $T_5=2$ (average);
If 400<D<1000 NM or 40<Tflight<100 minutes, then $T_5=1$ (bad); and
If D>1000 NM or Tflight>100 minutes, then $T_5=0$ (very bad),
where D is the distance in nautical miles (NM) between the aircraft and the point fixed for the RTA time constraint and Tflight the flight time remaining to reach this point.

Advantageously, the RTA time constraint being established by a communication between the aircraft and an air traffic controller, the calculation of an overall confidence index $T_G$ comprises the determination of a sixth confidence index $T_6$ on the basis of the duration of the communications between the air traffic controller and the aircraft.

Figure 2:
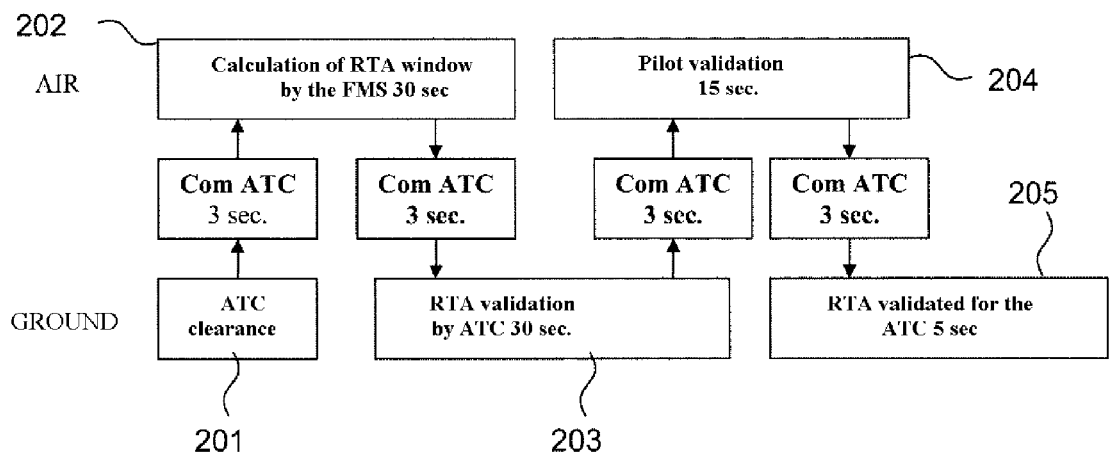
FIG. 2 illustrates the communications necessary for the establishment of a time constraint.

FIG. 2 illustrates the communications necessary for the establishment of the time constraint. The ATC RTA clearance 201 gives a time of passby at a given point to be complied with by the aeroplane. On the basis of this RTA clearance, the FMS returns 202 an RTA time window to the ground (ATC). The ground (ATC) selects 203 a time in the time window and transmits it to the pilot who validates it 204.

The calculation of the time window is complex and takes a certain time. This calculation time can have consequences on the calculation of the size of the RTA window in so far as the aeroplane traverses some distance during this time span.

Thus, the aeroplane traverses some distance when the ATC takes some time to fix an RTA time constraint and when the pilot takes some time to validate it.

Within the operational framework of air traffic management, this calculation and validation time can have consequences on the calculation of the size of the time window in so far as the aeroplane traverses some distance and this constitutes so much distance over which it cannot modify these speed directives in order to reach the RTA constraint.

The time estimations associated with each task are all-inclusive and proposed by way of example. In this example, it is possible to estimate at 80 seconds the duration between the moment when the FMS predictions commence the calculation of the window until the moment when the pilot activates the RTA request.

For information, the time to change engine setting so as to reach the speed directive making it possible to comply with the RTA time constraint is already taken into account in the calculation of the time window.

Figure 3:
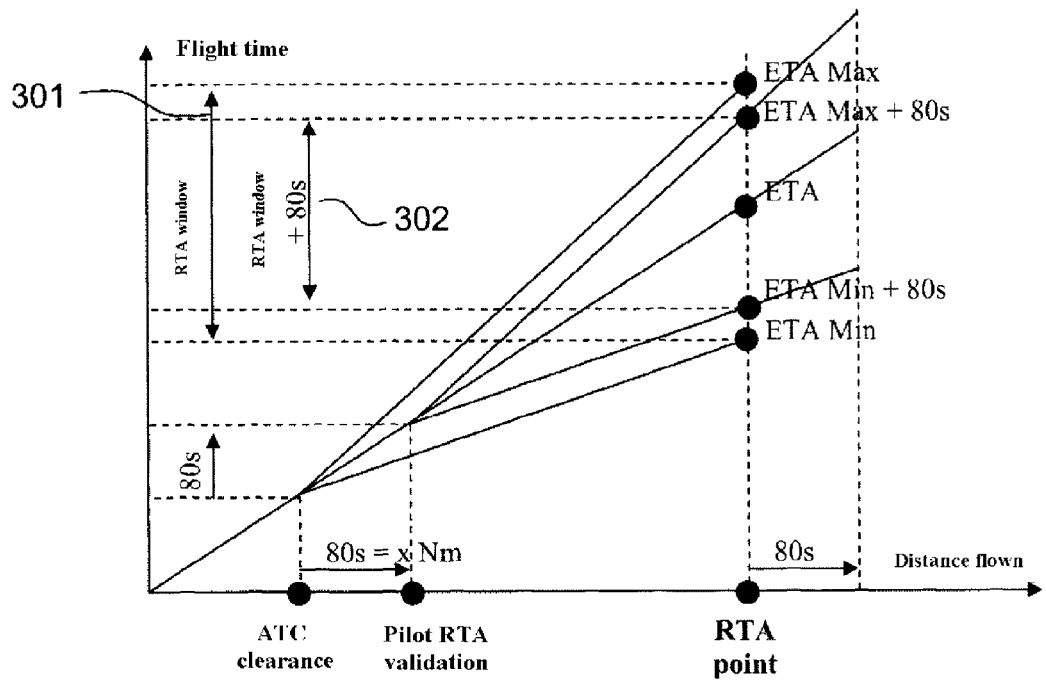
FIG. 3 illustrates the constriction of the time window on the point after 80 seconds.

FIG. 3 illustrates the constriction of the time window on the point after 80 seconds. The ordinate axis represents a flight time and the abscissa axis a distance flown. The figure illustrates a first time window 301 indicated by an aircraft to the ATC and a second more restricted time window 302 valid after the validation of the RTA time constraint by the pilot (80 seconds later in the example).

Figure 4:
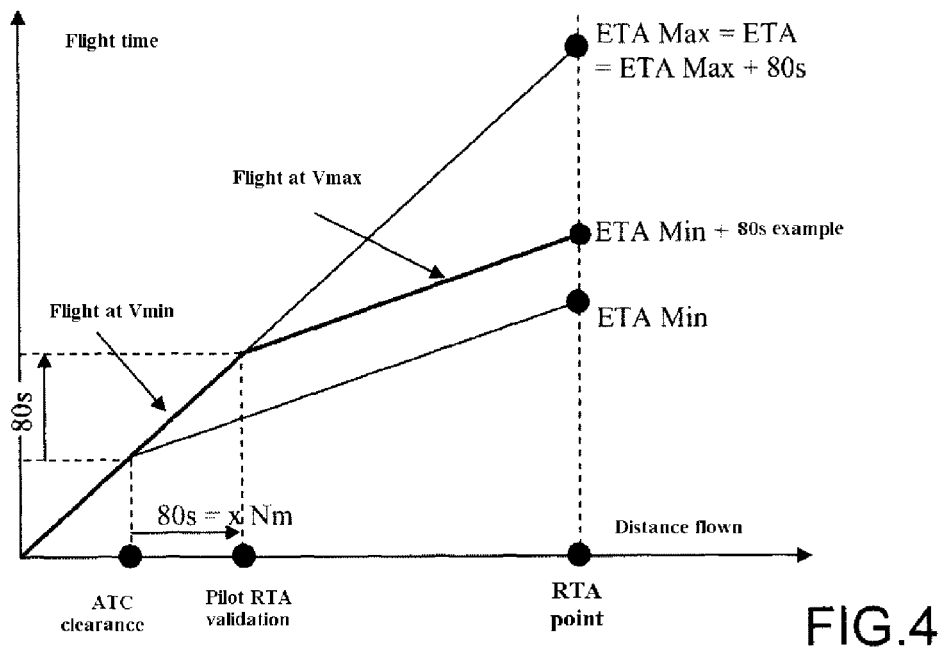
FIG. 4 illustrates the progress of a flight after the validation of a time constraint by the pilot.

If the aeroplane is flying at the minimum speed Vmin and control asks it to comply with an RTA time constraint at the minimum arrival time ETAmin, the aeroplane must go to the maximum speed Vmax after the 80 seconds. FIG. 4 shows how, after 80 seconds of validation time, the objective of minimum arrival time ETAmin is no longer achievable. At best, the aeroplane will be able to approach as close thereto as "ETAmin+80 s example".

The sixth confidence index takes into account the duration of communication between air traffic control and the aeroplane. This communication time depends on the quality of the data link. It varies from a few seconds to several minutes.

Advantageously, the calculation of an overall confidence index ($T_G$) is carried out by an arbitrary combination of the first ($T_1$), of the second ($T_2$), of the third ($T_3$), of the fourth ($T_4$), of the fifth ($T_5$), and of the sixth ($T_6$) confidence index, the said combination being for example a weighted sum.

Once this overall confidence index has been calculated, the RTA margins can be deduced therefrom by a conventional prediction calculation by adding to the component of the wind predicted over the trajectory of the aeroplane a component $V_G$ which is penalizing for the calculation of the profiles ETAmin and ETAmax. $V_G$ is a headwind for the calculation of the profile ETAmin and a tailwind for ETAMax.

For the calculation of $V_G$ as a function of the confidence index $T_G$, a linear relation or else the following relations are for example used:

If $5 \leq T_G < 4$ (very good) then abs($V_G$)=2 knots;
If $4 \leq T_G < 3$ (good) then abs($V_G$)=4 knots;
If $3 \leq T_G < 2$ (average) then abs($V_G$)=6 knots;
If $2 \leq T_G < 1$ (average) then abs($V_G$)=8 knots; and
If $1 \leq T_G < 0$ (bad) then abs($V_G$)=10 knots.

Advantageously, the aircraft following a trajectory to attain the given point, the trajectory comprising speed limitations, the method furthermore comprises the following steps: the addition of a margin in the speed limitations of the trajectory and the calculation of a minimum time of arrival ETAmin at the given point on the basis of a maximum speed complying with the margins in the speed limitations, the calculation of the second time window taking into account the minimum time of arrival ETAmin at the given point.

During the calculation of the minimum arrival time ETAmin, provision is generally made for the aeroplane to be flown at maximum speed. If there are speed constraints along the flight trajectory and if a profile is constructed which makes provision for the aeroplane to be flown at the exact value of this constraint (for example, 250 knots at 10,000 feet) there is then no means of acceleration if a drift in the predicted arrival time is noted (due, for example, to an increase in the wind, etc.) in so far as this constraint is limiting.

By virtue of the margin in the speed limitations, it is possible to calculate minimum ETAmin and maximum ETAmax arrival times in which an acceleration margin is allowed for in order to adhere to the RTA time constraint in case of drift.

For example, in the case of a limitation of 250 knots at 10,000 feet, it is possible to take a margin of 10 knots of acceleration and thus propose a minimum arrival time ETAmin which complies with this constraint by basing oneself on a speed of 240 knots at 10,000 feet. This therefore affords the possibility of accelerating the aeroplane up to 250 knots (10 knots of acceleration) so as to overhaul a drift in the time of arrival at the given point of the RTA time constraint.

Advantageously, the margin evolves as the flight proceeds. If the degree of confidence in the ability to comply with the RTA time constraint is high, then the margin is decreased so as to optimize flight management and especially fuel consumption.

For example, if no drift is noted in the arrival time at the given point of the RTA constraint in the course of the flight which requires acceleration under 10,000 feet, it is possible to recalculate an optimal profile with a speed of 245 knots under 10,000 feet initially, and then 250 knots under 10 000 feet in the course of the following convergence.

This margin could be dependent on the RTA tolerance. If the RTA constraint must be reached at an instant T with a high tolerance dT, the margin will be smaller than if the tolerance dT is low.

The lower the constraint speed, the larger the margin must be, for example, 12 knots for the speed limit or 15 knots for a speed constraint at 300 knots.

The invention also provides a device for calculating a time window for an RTA time constraint of arrival of an aircraft at a given point, the aircraft receiving wind predictions and comprising a sensor for measuring the wind, the device including means for calculating a first time window, the device also including:

means for calculating an overall confidence index $T_G$ comprising the determination of a first confidence index $T_1$ on the basis of a deviation between wind predictions and wind measurements performed by the aircraft, means for calculating a margin for the time constraint on the basis of the overall confidence index $T_G$, means for calculating a second window on the basis of the first time window and of the calculated margin.

The device further includes means for implementing the various steps of the method according to the invention.

What is claimed is:

1. A method for calculating a time window for a time constraint of arrival of an aircraft at a given point, the aircraft receiving wind predictions and comprising a sensor for measuring the wind, said method comprising a calculation of a first time window, said method further comprising:
- the calculation of an overall confidence index comprising the determination of a first confidence index on the basis of a deviation between wind predictions and wind measurements performed by the aircraft;
- the calculation of a margin for the time constraint on the basis of the overall confidence index;
- the calculation of a second time window on the basis of the first time window and of the calculated margin; and
- the transmission of the second time window to an air traffic controller.

2. The method according to claim 1, wherein the determination of a first confidence index comprises the calculation of a bias defining a mean deviation between the wind predictions and measurements performed during a time interval.

3. The method according to claim 2, wherein the calculation of the overall confidence index comprises the determination of a second confidence index, taking into account the stability of the winds, on the basis of the calculation of a standard deviation in the winds measured by the aircraft.

4. The method according to claim 3, wherein
the wind predictions are delivered by a source, and
the calculation of an overall confidence index comprises the determination of a third confidence index on the basis of a confidence level accorded to the source delivering the wind predictions.

5. The method according to claim 4, wherein
the wind predictions are updated at regular intervals, and
the calculation of the overall confidence index comprises the determination of a fourth confidence index taking into account the last date of updating of the wind predictions.

6. The method according to claim 5, wherein the calculation of the overall confidence index comprises the determination of a fifth confidence index on the basis of the distance between the aircraft and the point at which the time constraint is fixed.

7. The method according to claim 6, wherein
the time constraint is established by a communication between the aircraft and an air traffic controller, and
the calculation of the overall confidence index comprises the determination of a sixth confidence index on the basis of the duration of the communications between the air traffic controller and the aircraft.

8. The method according to claim 7, wherein the calculation of the overall confidence index is carried out by an arbitrary combination of the first, second, third, fourth, fifth, and sixth confidence indexes, said arbitrary combination being a weighted sum.

9. The method to claim 1, wherein, the aircraft following a trajectory to attain the given point, the trajectory comprising speed limitations, the method further comprises:
- the addition of a margin in the speed limitations of the trajectory and the calculation of a minimum time of arrival at the given point on the basis of a maximum speed complying with the margins in the speed limitations; and
- the calculation of the second time window taking into account the minimum time of arrival at the given point.

10. A device for calculating a time window for a time constraint of arrival of an aircraft at a given point, the aircraft receiving wind predictions and comprising a sensor for measuring the wind, said device comprising means for calculating a first time window, said device further comprising:
- means for calculating an overall confidence index comprising the determination of a first confidence index on the basis of a deviation between wind predictions and wind measurements performed by the aircraft;
- means for calculating a margin for the time constraint on the basis of the overall confidence index;
- means for calculating a second time window on the basis of the first time window and of the calculated margin; and
- means for transmitting the second time window to an air traffic controller.

* * * * *